(12) United States Patent
Golas et al.

(10) Patent No.: US 10,115,177 B2
(45) Date of Patent: Oct. 30, 2018

(54) ONLINE TEXTURE COMPRESSION AND DECOMPRESSION IN HARDWARE

(71) Applicant: Samsung Electronics Co., Ltd., Suwon-si, Gyeonggi-do (KR)

(72) Inventors: Abhinav Golas, Mountain View, CA (US); Sangheon Lee, Hwansung-si (KR); Vandit Mehra, Delhi (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/676,936

(22) Filed: Aug. 14, 2017

(65) Prior Publication Data

US 2017/0345125 A1   Nov. 30, 2017

Related U.S. Application Data

(63) Continuation-in-part of application No. 14/742,291, filed on Jun. 17, 2015, now Pat. No. 9,947,071.

(60) Provisional application No. 62/412,026, filed on Oct. 24, 2016, provisional application No. 62/018,178, filed on Jun. 27, 2014.

(51) Int. Cl.
*G06T 1/60* (2006.01)
*G06T 1/20* (2006.01)

(52) U.S. Cl.
CPC . *G06T 1/60* (2013.01); *G06T 1/20* (2013.01)

(58) Field of Classification Search
CPC ........ G06F 2212/40; G06K 9/527; G06T 9/00
See application file for complete search history.

(56) References Cited

U.S. PATENT DOCUMENTS

| | | |
|---|---|---|
| 5,539,468 A | 7/1996 | Suzuki et al. |
| 6,137,914 A | 10/2000 | Ligtenberg et al. |
| 6,243,416 B1 | 6/2001 | Matsushiro et al. |
| 6,668,086 B1 | 12/2003 | Enokida |
| 6,819,793 B1 | 11/2004 | Reshetov et al. |
| 7,202,912 B2 | 4/2007 | Aneja et al. |
| 7,236,636 B2 | 6/2007 | Sakai et al. |
| 7,321,693 B2 | 1/2008 | Kadowaki |
| 7,576,888 B2 | 8/2009 | Sakai et al. |
| 7,750,938 B2 | 7/2010 | Grimes et al. |
| 8,452,083 B2 | 5/2013 | Kambegawa |
| 8,478,057 B1 | 7/2013 | Cui et al. |
| 8,509,532 B2 | 8/2013 | Ushiku |

(Continued)

*Primary Examiner* — Thomas Lett
(74) *Attorney, Agent, or Firm* — Lewis Roca Rothgerber Christie LLP (57) ABSTRACT

A method of variable rate compression of image data in an image pipeline of a graphics processing system, the method includes identifying, by a processor of the graphics processing system, a set of cTiles associated with the image data, each cTile including a plurality of pixels, for each cTile of the set of cTiles identifying, by the processor, a pivot pixel from among the plurality of pixels, identifying, by the processor, a compression type of the cTile by comparing, bit-by-bit , pixels within the cTile with the pivot pixel, and compressing, by the processor, the cTile based on the identified compression type, and generating, by the processor, a metadata entry associated with the set of cTiles, the metadata entry indicating the compression type of each one of the set of cTiles and defining a mapping between an uncompressed address space of the set of cTiles and a compressed address space.

20 Claims, 4 Drawing Sheets

(56) References Cited

U.S. PATENT DOCUMENTS

| | | | |
|---|---|---|---|
| 8,533,166 B1 | 9/2013 | Sulieman et al. | |
| 8,553,301 B2 | 10/2013 | Tamura | |
| 8,659,793 B2 | 2/2014 | Takeishi | |
| 8,660,347 B2 | 2/2014 | Tamura | |
| 9,378,560 B2* | 6/2016 | Iourcha | G06T 9/00 |
| 2008/0317362 A1 | 12/2008 | Hosaki et al. | |
| 2009/0148059 A1 | 6/2009 | Matsuda | |
| 2011/0069076 A1 | 3/2011 | Lindholm et al. | |
| 2011/0148894 A1* | 6/2011 | Duprat | G06T 11/001 |
| | | | 345/552 |
| 2011/0188750 A1 | 8/2011 | Tamura | |
| 2011/0243469 A1* | 10/2011 | McAllister | G06T 9/00 |
| | | | 382/239 |
| 2012/0320067 A1 | 12/2012 | Iourcha et al. | |
| 2013/0170558 A1 | 7/2013 | Zhang | |
| 2017/0256024 A1* | 9/2017 | Abraham | G06T 15/04 |

* cited by examiner

ONLINE TEXTURE COMPRESSION AND DECOMPRESSION IN HARDWARE

CROSS-REFERENCE TO RELATED APPLICATION(S)

This application claims priority to, and the benefit of, U.S. Provisional Application No. 62/412,026 ("Online Texture Compression and Decompression in Hardware"), filed on Oct. 24, 2016, the entire content of which is incorporated herein by reference.

This application is also a continuation in part of U.S. application Ser. No. 14/742,291 ("Texture Pipeline with Online Variable Rate Dictionary Compression"), filed on Jun. 17, 2015, which claims priority to and the benefit of U.S. Provisional Application No. 62/018,178, filed on Jun. 27, 2014, the entire contents of both of which are incorporated herein by reference.

FIELD

Aspects of embodiments of the present disclosure are generally related to a graphics processing unit (GPU). In particular, the present disclosure is related to online texture compression and decompression in hardware.

BACKGROUND

Texture mapping in a graphics processing unit (GPU) is responsible for adding detail to a computer generated graphics model. The process involves fetching actual color values and filtering them to produce the color for every pixel in the model. Texturing is a critical design component for 3D rendering performance and incurs a significant fraction of total processor power and memory. In typical GPUs, the color values are fetched from memory before further filtering. Memory access due to texturing contributes to memory bandwidth and memory power and is a major source of performance bottlenecks.

With the advent of deferred rendering approaches, memory usage has only increased. In a deferred rendering pipeline, all relevant material properties of objects in a scene are transferred from scene geometry onto multiple images. Lighting and all subsequent rendering and lighting calculations are then performed on a per-pixel level in post-processing stages, which consume these intermediate images, collectively known as the G(eometry)-buffer, and create the output image displayed on the screen. These images, and intermediate image traffic, constitute the primary consumer of memory bandwidth and a key limiter of rendering performance. For example, most images on current generation screens are rendered at 1080p with 32 bits per pixel—which by itself constitutes 8 MB of data and is expected to be rendered 30-60 times a second—requiring 240-480 MB per second of bandwidth just for the final image. The bandwidth constraints become even more severe with 4K resolution screens, which are gaining in popularity in consumer products.

As a result, reducing or eliminating memory accesses due to texturing is an important GPU design constraint.

The above information disclosed in this Background section is only for enhancement of understanding of the present disclosure, and therefore it may contain information that does not form the prior art that is already known to a person of ordinary skill in the art.

SUMMARY

Aspects of embodiments of the present disclosure are directed to a system capable of improving rendering performance while lowering energy consumption by compressing images during the rendering process. Some embodiments of the disclosure perform lossless or near lossless compression, so as to not compromise the rendered result, and to ensure that the compressions and decompression remain transparent to the end user and applications.

Some embodiments of the present disclosure employ compression methods that use bit-level operations, which make the compression methods essentially agnostic as to the underlying data type. This greatly simplifies control mechanisms for the compressor and decompressor, as compared to methods that rely on knowledge of the underlying data type. Further, some embodiments of the present disclosure perform framebuffer compression, which allows any producer or consumer of image data—including a display controller—to utilize this compression method to reduce transmission energy.

Some embodiments of the present disclosure interleave bits of multiple channels of data into bigger single values and use them as base data to reduce the number of values to compress and decompress, thereby saving hardware area.

Some embodiments of the present disclosure utilize the cache line as the minimal sized entity for compression, allowing the compression method to be used transparently with other texture compression methods, leading to stacked compression methods.

According to some embodiments of the present disclosure, there is provided a method of variable rate compression of image data in an image pipeline of a graphics processing system, the method including: identifying, by a processor of the graphics processing system, a set of cTiles associated with the image data, each cTile including a plurality of pixels; for each cTile of the set of cTiles: identifying, by the processor, a pivot pixel from among the plurality of pixels; identifying, by the processor, a compression type of the cTile by comparing, bit-by-bit , pixels within the cTile with the pivot pixel; and compressing, by the processor, the cTile based on the identified compression type; and generating, by the processor, a metadata entry associated with the set of cTiles, the metadata entry indicating the compression type of each one of the set of cTiles and defining a mapping between an uncompressed address space of the set of cTiles and a compressed address space.

In some embodiments, the image data is a texture or an image, and wherein the variable rate compression is a lossless compression.

In some embodiments, the plurality of pixels is spatially contiguous pixels, and each cTile corresponds in size to a cache line of the graphics processing system.

In some embodiments, the pivot pixel is a static pixel within each one of the set of cTiles.

In some embodiments, the identifying the compression type of the cTile includes: calculating, by the processor, differences between binary values of the pixels of the cTile and the pivot pixel; and determining, by the processor, whether all the differences are zero.

In some embodiments, each pixel of the plurality of pixels in the cTile includes one or more channels, wherein the calculating the differences includes: for each of the one or more channels, calculating, by the processor, channel differences between corresponding channel binary values of the pixels of the cTile and the pivot pixel, and wherein the determining whether all the differences are zero includes: determining, by the processor, that the channel differences are zero for each of the one or more channels.

In some embodiments, the identifying the compression type of the cTile further includes: in response to determining that all differences are zero, determining, by the processor, the compression type as a constant type.

In some embodiments, the identifying the compression type of the cTile further includes: in response to determining that all differences are not zero, calculating, by the processor, a size of the cTile when compressed; determining, by the processor, whether the size of the cTile when compressed fits within one of quantized compression sizes; in response to determining that the size of the cTile when compressed fits within one of the quantized compression sizes, identifying, by the processor, the compression type as a differential type; and in response to determining that the size of the cTile when compressed does not fit within one of the quantized compression sizes, identifying, by the processor, the compression type as an uncompressed type.

In some embodiments, a cache line size is 64 bytes and the quantized compression sizes include 8, 16, 24, 32, 40, or 48 bytes.

In some embodiments, compressing the cTile based on the identified compression type includes: encoding, by the processor, the cTile using a variable-length code, in response to determining that the compression type is the differential type; and passing through the cTile without encoding, in response to determining, by the processor, that the compression type is uncompressible.

In some embodiments, the variable-length code is a Golomb-Rice code or a Huffman code.

In some embodiments, generating a metadata entry associated with the set of cTiles includes: determining, by the processor, whether all of the set of cTiles have the same constant binary value; and in response to determining that all of the set of cTiles have a same constant binary value, generating, by the processor, the metadata entry to include the constant binary value and indicating that the compression type is a constant type.

In some embodiments, generating a metadata entry associated with the set of cTiles includes: write the compressed cTile into a next available memory location within a memory cache coupled to the processor; and generating the metadata entry to include the compression type, length and address of each one of the set of cTiles, wherein the address includes a base address of the set of cTiles and an offset of a corresponding one of set of cTiles from the base.

According to some embodiments of the present disclosure, there is provided a method of variable rate decompression of image data in an image pipeline of a graphics processing system, the method including: receiving, by a processor of the graphics processing system, a request for a cache line of uncompressed pixel data from a requestor; identifying, by the processor, a set of cTiles including a target cTile based on the request, the target cTile corresponding to the cache line of uncompressed pixel data; retrieving, by the processor, a metadata entry associated with the set of cTiles; determining, by the processor, whether the set of cTiles are constant based on the retrieved metadata entry; in response to determining that the set of cTiles are constant, extracting, by the processor, a constant binary value of the set of cTiles from the metadata entry and returning the constant binary value to the requestor as the cache line of uncompressed pixel data; and in response to determining that the set of cTiles are not constant: extracting, by the processor, a compression type of the target cTile, an address of the target cTile from the metadata entry, and a length of the target cTile; retrieving, by the processor, the target cTile from a memory cache based on the address of the target cTile and the length of the cTile; and decompressing, by the processor, the retrieved target cTile based on the compression type of the target cTile, and returning the decompressed target cTile to the requestor as the cache line of uncompressed pixel data.

In some embodiments, the address includes a base address of the set of cTiles and an offset of the target cTile from the base.

In some embodiments, the identifying the set of cTiles includes: mapping, by the processor, the request to the set of cTiles in the memory cache.

In some embodiments, a size of each of the set of cTiles is less than a cache line size, and a size of the decompressed target cTile is equal to the cache line size.

In some embodiments, the compression type includes a constant type, an uncompressed type, or a differential type.

In some embodiments, a length of the cache line is 64 bytes, and a length of the target cTile is 8, 16, 24, 32, 40, or 48 bytes.

According to some embodiments of the present disclosure, there is provided a graphics processing system for variable rate compression of image data in an image pipeline, the system including: a processor; and a processor memory local to the processor, wherein the processor memory has stored thereon instructions that, when executed by the processor, cause the processor to perform: identifying a set of cTiles associated with the image data, each cTile including a plurality of pixels; for each cTile of the set of cTiles: identifying a pivot pixel from among the plurality of pixels; identifying a compression type of the cTile by comparing, bit-by-bit, pixels within the cTile with the pivot pixel; and compressing the cTile based on the identified compression type; and generating a metadata entry associated with the set of cTiles, the metadata entry indicating the compression type of each one of the set of cTiles and defining a mapping between an uncompressed address space of the set of cTiles and a compressed address space.

BRIEF DESCRIPTION OF THE DRAWINGS

The accompanying drawings, together with the specification, illustrate example embodiments of the present disclosure, and, together with the description, serve to explain the principles of the present disclosure.

DETAILED DESCRIPTION

The detailed description set forth below is intended as a description of example embodiments of a system and method for defect detection, provided in accordance with the present disclosure, and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Generally speaking, embodiments of the present disclosure are directed to a compression system providing variable rate, lossless compression of image data and decompression of compressed data in a graphics system. The compression involves generating metadata associated with, and identifying, the compressed data, which the decompressor may utilize to properly decode the compressed data into a lossless representation of the original image data. As the combined memory footprint of the compressed data and associated metadata is smaller than the actual uncompressed image data, embodiments of the present disclosure may provide substantial bandwidth savings in transmitting image data in a system, such as a graphics processing unit (GPU), a system on chip (SoC), and the like. In addition, the compression system, according to some embodiments of the present disclosure, provides further features that make it particularly suitable for insertion into multiple places in a GPU, namely, utilizing compression and decompression methods that are not only simple and cheap, in terms of the hardware required and the energy consumed, but are also agnostic as to the underlying data type and rely only on the bit-width of each piece of data.

Figure 1:
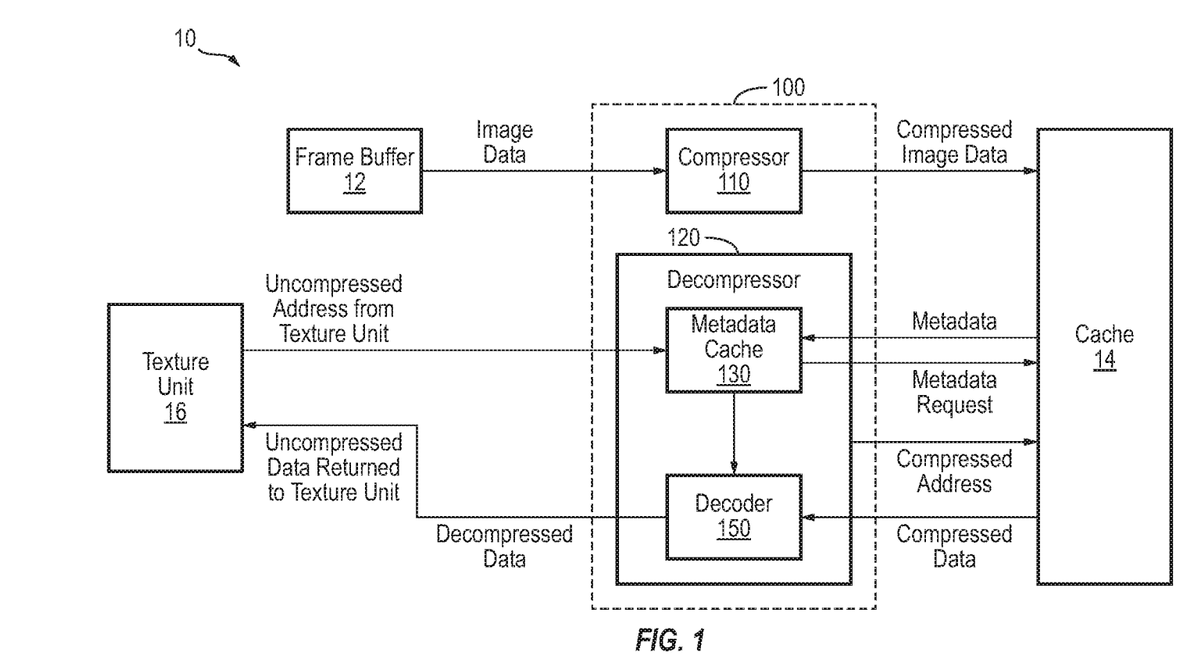
FIG. 1 is a block diagram illustrating variable rate compression and decompression of a compression system in a graphics processing system, according to some example embodiments of the present disclosure.

FIG. 1 is a block diagram illustrating variable rate compression and decompression of the compression system 100 in a graphics processing system 10 according to some example embodiments of the present disclosure.

In some examples, the graphics processing system 10 may be implemented as part of a larger graphics pipeline in a GPU or a SoC having processors, on-chip memory, and an image pipeline. Referring to FIG. 1, the compression system 100 includes a compressor (e.g., a variable rate compressor) 110 and a decompressor (e.g., a variable rate decompressor) 120 for respectively performing compression and decompression in a graphics system having a frame buffer 12 that outputs image data to the compression system 100, a memory cache (e.g., an on-chip L2 cache) 14 to, for example, minimize or reduce a need to access off-chip memory, and a texture unit 16 for receiving the image data.

In some embodiments, the compressor 110 supports different compression lengths for different types of data (e.g., a constant data compression type and a differential data compression type, as described below in more detail). The compressed image data generated by the compressor 110 may be stored in the memory cache 14. Additionally, the compressor 110 generates metadata to assist in address mapping during decompression. The decompressor 120 includes a metadata cache 130 and a decoder 150. The metadata cache 130 is populated with metadata via metadata requests to the memory cache 104, as illustrated by the arrows in FIG. 1. The metadata is cached so that the metadata may be reused multiple times for each fetch. This may serve to increase the bandwidth benefits. Image data generally has a high degree of spatial locality. As a result, a cache line of metadata may be initially accessed followed by one or more data cache lines of compressed data from the memory cache as needed.

The compressed data may be accessed from the memory cache 104 and provided to the decoder 150. According to some embodiments, the decoder 150 supports different types of decoding based on different compression types and thus may also be considered as having several different decoders. A pass-through path may be provided for uncompressed data. Once the compressed data is received, it is sent to the appropriate decoder depending on the compression type, which may be indicated by a number of bits in the metadata. For example, a 3-bit code may be used to indicate 7 different compression types and an uncompressed data type. More generally, an arbitrary number of different compression types may be supported.

When the texture unit 16 requests image data by sending an address associated with the image data to the decompressor 120, the decompressor 120 looks up the address in the metadata cache 130 (e.g., via a header table or other data structure) to find the compressed memory address in the memory cache 14.

According to some embodiments, the compression system 100 utilizes a cache line as the basic entity for compression, which serves to simplify the design of the compressor 110 and decompressor 120. The cache line is defined as the minimal entity of a memory subsystem, and is most commonly 64 bytes in modern CPUs and GPUs. Henceforth, this minimal entity is referred to as a cache line tile or cTile. The cTile represents an arbitrary subset of the received image data that the compressor 110 compresses as a single block. In some embodiments, the cTile represents a number of pixels in an image whose data (e.g., color values) can be stored, uncompressed, in one cache line. The pixels making up the cTile may be a set of spatially contiguous pixels. For example, the cTile may represent a row (or a partial row) of pixels of an image or a rectangular set of pixels of a portion of an image. In some embodiments, the cTile may be defined as a square of pixels in an image, in order to increase or maximize the spatial coherency of the data and improve (e.g., increase) compression.

As an example, the data from four pixels in a square or in a line of the image, which together amount to the size of the cache line (e.g., 64 bytes), may form one cTile. Thus, when uncompressed, the size of the cTile is the same as a cache line; however, compressed, the size of the cTile may become smaller than the cache line (e.g., 16 bytes, 8 bytes, or even smaller).

As will be understood by a person of ordinary skill in the art, the definition of a cTile, as used herein, is portable across compressed and uncompressed data and is independent of the number of bytes.

As noted above, the compression methods employed by the compression system 100 are lossless, and thus variable-rate. As a result, in some embodiments, an additional set of metadata is utilized to define the kind of compression used for each cTile, and the corresponding size of the compressed cTile. According to some embodiments, to reduce metadata overhead, a metadata entry is defined for a set of spatially coherent cTiles (e.g., a set of 6, 8, or 16 contiguous cTiles), rather than being defined for each individual cTile. This spatially coherent set of cTiles, which represents a rectangular set of pixels, is referred to herein as an mTile. In other words, there is a one-to-one correspondence between mTiles and metadata entries. The meta data entry corresponding to the mTile stores information on how each of the child cTiles (i.e., the cTiles within the mTile) is compressed and the compressed size of each cTile. Increasing the number of cTiles within the same mTile may reduce the metadata overhead; however, increasing the number of cTiles within an mTile beyond a certain point may come at the cost of compression, so a balance may be struck between compression and metadata overhead depending on the requirements of a particular implementation.

The metadata entry for each mTile may be stored in the cache 14, and accessed by the decompressor 120 via the metadata cache 130.

Figure 2:
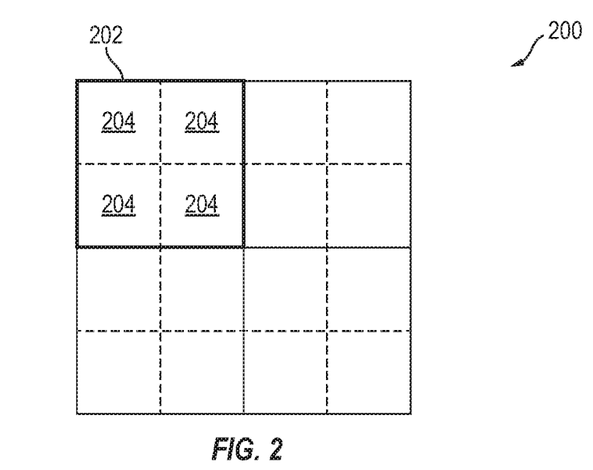
FIG. 2 illustrates an mTile associated with a plurality of cTiles, according to some example embodiments of the present disclosure.

FIG. 2 illustrates an mTile 200 associated with a plurality of cTiles 202, according to some example embodiments of the present disclosure.

Referring to FIG. 2, the compressor 110 organizes the uncompressed image data (e.g., texture or pixel data) it receives from the frame buffer 12 into a set of cTiles 202. In some examples, each individual cTile 202 corresponds to an array of pixel color values 204 having a pre-selected size of m×n (where m and n are integers, at least one of which is greater than 1), such as a 2×2 array (indicated by dashed lines in FIG. 2) or a 4×3 array. An mTile 200 may be associated with a p×q set of cTiles 202 (where p and q are integers, at least one of which is greater than 1; e.g., a 2×2 set of cTiles 202). In some embodiments, m and n are the same, and p and q are the same.

For the purposes of illustrating aspects of the present disclosure, each element 204 in the array of values in a cTile will be described as a pixel or texel having color data, but it will be understood that, more generally, other types of data could be represented by the texture data, such as depth data, normals, reflection maps, and/or the like. In computer graphics, a texel (texture element) is the smallest graphical element in two-dimensional (2-D) texture mapping to create the impression of a textured surface. A texel is similar to a pixel (picture element) because it represents an elementary unit in a graphics pipeline. However, there may be more than one color value mapped to each texel. Additionally, more generally, a texture can be considered to be an array of data and may include color data, luminance data, stencil data, or other types of data.

The cTile and mTiles may be defined in terms of bytes, commonly 64 bytes and 256 bytes, respectively. However, in terms of spatial extent in an image, the cTiles and mTiles may be defined as pitch linear or block linear. The spatial definition may depend on the size of a pixel in bytes, which is commonly 1, 2, 3, 4, 8, 12, or 16 bytes, depending on the underlying format. For example, the format RGB8, which is a commonly used rendering format, is 3 bytes in size, with each of red (R), green (G), or blue (B) channels consuming one byte of the three. The commonly used HDR (High-Dynamic Range) intermediate format RGBA16F consists of 4 16-bit floating-point numbers, leading to 8 bytes per pixel. In some embodiments, spatial dimensions are determined by rounding pixel size to the nearest power of 2, leading to the unique pixel sizes of 1, 2, 4, 8, or 16 bytes. The two possible spatial dimensions of a cTile for a given pixel size depend on whether the texture is laid out as rows of pixels—called pitch linear—or as rectangular blocks of pixels—called blocks linear. In the case of pitch linear, cTile dimensions may be N×1 (N being an integer greater than 1), where the cTile contains pixel data for N pixels within a row. In the case of block linear, the rectangle dimensions may be kept as close as possible to square to increase or maximize spatial coherence.

mTile dimensions as a function of cTile dimensions may also vary based on layout. For example, in pitch linear layouts, mTiles may be associated with M×1 cTiles (where M is an integer greater than 1, e.g., 4), while in block linear layouts, mTiles may be associated with a rectangular or square set of cTiles (e.g., 2×2, if M=4). For examples in which the cache line/cTile is 64 bytes, the dimensions for cTiles and mTiles for some example pixel sizes may be tabulated as shown in Table 1 below:

TABLE 1

| Pixel Size in Bytes | cTile Dimensions (Block Linear) | mTile Dimensions (Block Linear) | cTile Dimensions (Pitch Linear) | mTile Dimensions (Pitch Linear) |
|---|---|---|---|---|
| 1 | 8 × 8 | 16 × 16 | 64 × 1 | 256 × 1 |
| 2 | 8 × 4 | 16 × 8 | 32 × 1 | 128 × 1 |
| 4 | 4 × 4 | 8 × 8 | 16 × 1 | 64 × 1 |
| 8 | 4 × 2 | 8 × 4 | 8 × 1 | 32 × 1 |
| 16 | 2 × 2 | 4 × 4 | 4 × 1 | 16 × 1 |

Figure 3:
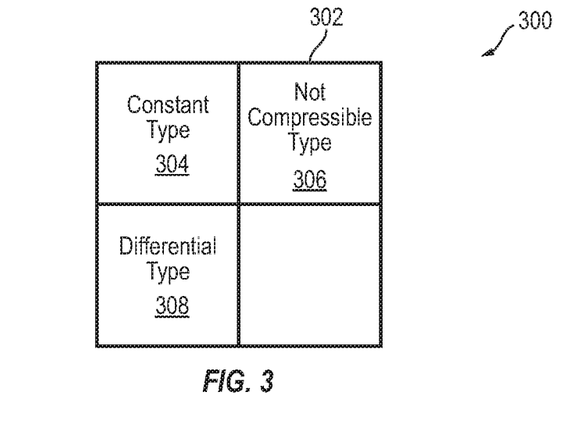
FIG. 3 illustrates the different compression types of cTiles, according to some example embodiments of the present disclosure.

FIG. 3 illustrates the different compression types of cTiles 302, according to some example embodiments of the present disclosure.

In some embodiments, each cTile 302 may be classified as having one of three compression types, namely a constant type 304, in which all pixel data within the cTile 302 have the same binary value (e.g., the same color value); an uncompressed type 306, in which all pixel data within the cTile 302 are stored as-is without any compression; and a differential type 308, in which pixel data within the cTile 302 are stored as deltas from a pivot within the cTile.

Determining the compression types of the cTiles permits optimizing the compression of the image data at a cTile level. For example, for a constant type cTile ("constant cTile"), in which all of the pixels have the same binary value, only a single representative value needs to be stored to represent all of the binary values of the cTile. This representative value may not be compressed and may be stored as-is. Additionally, the compression of a differential type cTile ("differential cTile") containing higher frequency content can be performed using a longer compression length to implement lossless compression. Moreover, uncompressed type cTiles ("uncompressed cTiles") contain high frequency content that is not compressible without loss, and are passed through the compressor 110 without any compression.

To determine the compression type of a cTile, the compressor 110 computes deltas for all pixels within the cTile with respect to a pivot pixel ("pivot"). In some embodiments, the pivot represents a static pixel within the cTile that is used as a point of reference for calculating deltas, and which is known to both the compressor 110 and the decompressor 120. In some examples, the pivot may correspond to the origin point (i.e., the lowest coordinate point) of the cTile (e.g., the (0, 0) pixel at the bottom left corner or top left corner of the cTile). However, embodiments of the present disclosure are not limited to a static pivot. For example, the compressor 110 may dynamically select the pivot within each cTile and encode the location of the pivot within each cTile in the corresponding metadata entry, which would lead to more memory and bandwidth consumption relative to static pivot embodiments. However, dynamically selecting pivots may permit more cTiles to be compressed relative to using a static pivot. The pivot is a point that is used for comparison with all other points within the cTile.

The delta calculated by the compressor 110 represents a particular binary value (e.g., color value) of a pixel with respect to the pivot. In some embodiments, a bitwise delta, such as a bitwise XOR, is used; however, embodiments of the present disclosure are not limited thereto, and any suitable comparison function (e.g., a bit-level comparison function) may be used.

The compressor 110 may determine the compression type based on the result of the comparison operation (e.g., bit-level or bit-by-bit comparison operation). In the example of the bitwise XOR operation, when the binary values of all pixels within the cTile are the same, the bitwise XOR operation produces an output of all 0s. In such a case, the compressor 110 determines that the cTile is a flat or constant cTile. When the result of the XOR operation contains any non-zero value, the compressor 110 determines that the cTile is a differential type. The compressor 110 then encodes all deltas to the output stream using a variable length code, such as Golomb-Rice code; however, any other suitable method, such as Huffman encoding, may also be used. In some embodiments, if the sum of the bit sizes of the encoded deltas exceeds the bit size of the uncompressed cTile (i.e., the sum of the bit sizes of the binary values of all pixels within the cTile), the cTile is labeled as uncompressed (i.e., not compressible), and the cTile is passed through without any compression.

Because deltas are likely to be small when each individual channel within a pixel is considered independently, in some embodiments, separate deltas may be calculated for each channel. For example, a pixel having an RGBA8 format may include 4 deltas per pixel, one for each of red (R), green (G), blue (B), and alpha (A) channels. In embodiments in which a Golomb-Rice encoding is used, each channel value may be represented as a quotient and a remainder with respect to a base (e.g., with a base of 4). The quotient and the remainder may then be encoded using any suitable coding technique. For example, the compressor 110 may use unary coding for the quotient, and because the base may be a power of 2, the remainder can be represented in binary format with a fixed number of bits (which may be bounded by log2 of base). A benefit of Golomb-Rice compression is that the compressor 110 may calculate the size of the compressed cTile before actually doing the compression. For example, in a cTile of 4×4 pixels (i.e., 16 pixels), there is one pivot and 15 deltas for the non-pivot pixels. Therefore, the number of remainder bits may be 15 times the number of remainder bits for one pixel (i.e., log2(base)). When using unary code, the number of bits for the quotient may equal the quotient number of bits plus one. The size of the compressed cTile may then be determined as the sum of the number of bytes in the quotients, the number of bytes in the remainders, and the number of bytes of the pivot value in each channel.

Depending on the encoding technique utilized by the compressor 110 (e.g., the Golomb-Rice technique), it may be possible for a compressed cTile (e.g., one containing high frequency component data) to occupy a greater number of bits than the original uncompressed cTile. As such, in some embodiments, the compressor 110 compares the length (e.g., calculated length) of the compressed cTile with that of the uncompressed cTile to determine whether the compression results in a bit saving. If the compressed length is greater than the original, non-compressed length, the compressor 110 labels the cTile as uncompressed, and passes through the uncompressed cTile without any compression.

To simplify compression and decompression in hardware, in some embodiments, the compression system 100 quantizes the possible sizes of the compressed cTile to a subset of those possible. In examples in which a 3-bit value is used to represent 8 different cTile compression types, six different differential block types are possible (with two of the 8 types being used for constant and uncompressed cTiles). In such examples, a 64-byte cTile size may be compressed into one of 8, 16, 24, 32, 40, or 48 bytes. For example, the 3-bit code within the metadata entry may encode cTile type as illustrated in Table 2 below.

TABLE 2

| Encoded cTile type bits | cTile type |
| --- | --- |
| 000 | Constant/Flat |
| 001 | Uncompressed |
| 010 | 8-byte differential |
| 011 | 16-byte differential |
| 100 | 24-byte differential |
| 101 | 32-byte differential |
| 110 | 40-byte differential |
| 111 | 48-byte differential |

According to some embodiments, the compression system 100 achieves a reduction in the number of deltas by coalescing smaller values together. For example, a pixel format using 8-bit underlying data types, such as RGB8, may be expressed as two 16-bit numbers by coalescing together the R and G channels into one 16-bit number, and treating the B channel as a separate 16-bit number. Coalescing may be performed by a variety of suitable methods. For example, for single channel data, such as the B channel in the above example, the 8 bits from the B channel may simply be kept in the lower 8 bits of the 16-bit number. When coalescing two 8-bit numbers, such as the R and G channels in the above example, the compressor 110 may pack them together by, for example, mapping the 8 bits from the R channel to the lower 8 bits of the 16-bit number, and mapping the 8 bits from the G channel to the upper 8 bits of the 16-bit number. However, this may lead to larger deltas if G channel bits vary more than R channel bits.

Thus, according to some embodiments, the compressor 110 interleaves the bits of the coalesced numbers. For example, the compressor 110 may interleave the bits of the R and G channels of an RGB8 or RGBA8 pixel, which may be represented as {R7, R6, . . . R1, R0} and {G7, G6, . . . G1, G0}, respectively, to produce the interleaved number {R7, G7, R6, G6, . . . , R1, G1, R0, G0}. In some embodiments, the compressor 110 may perform further coalescing and interleaving to achieve an even greater reduction in the number of deltas, and hence a greater reduction in hardware complexity. For example, the compressor 110 may further coalesce and interleave the two resulting 16-bit numbers in the above example to generate an interleaved 32-bit number.

Pixel level interleaving may provide a significant reduction in hardware cost without substantially affecting compression. For example, if a 4×4 block of pixels having an RGBA8 data format is represented by a cTile, without interleaving, the compressor 110 would have to compare 60 8-bit numbers (4 channels×(16 pixels−1 pivots)) and compress 64 8-bit numbers for each cTile. By interleaving the R and G channels together and the B and A channels together, the compressor 110 has to compare just 30 16-bit numbers (2 coalesced channels×(16 pixels−1 pivots)) for each cTile. This, for example, reduces by half the number of quotients and remainders calculated by the compressor, which leads to smaller adder trees, among other hardware savings. Interleaving recursively only serves to amplify this effect. The hardware savings may also apply to the decompressor 120 as less hardware may be required to fetch and decompress fewer pieces of information.

Beyond compressing cTiles, an mTile also allows one additional level of compression when all cTiles within it are constant and have the same binary value. Metadata either consists of a constant color, or a combination of other pieces of information including the type of compression used for the underlying cTiles and the location or offset of compressed data in memory. This approach allows for fast and efficient decompression of larger constant regions, where only a metadata fetch may be required without fetching data from the memory cache 14.

Figure 4:
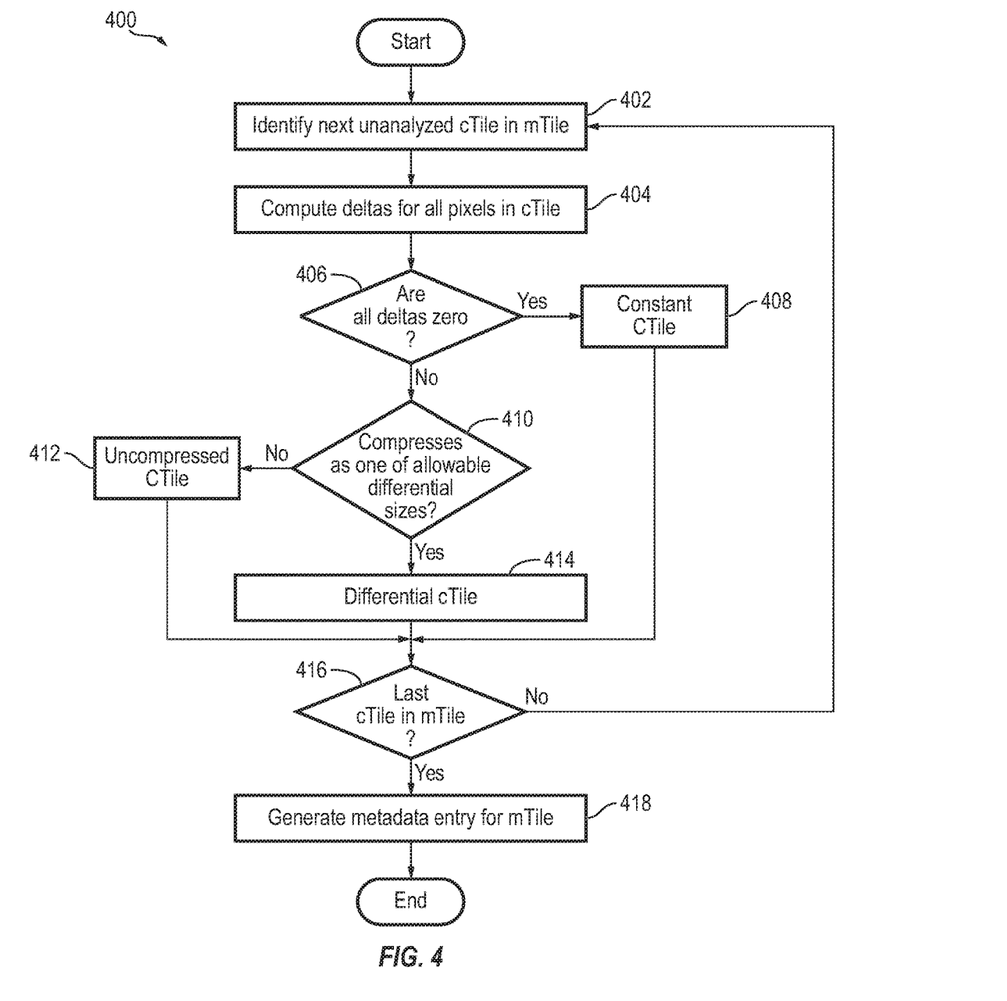
FIG. 4 is a flow diagram illustrating a process of variable rate compression of image data in an image pipeline of the graphics processing system, according to some example embodiments of the present disclosure.

FIG. 4 is a flow diagram illustrating a process 400 of variable rate compression of image data in an image pipeline of the graphics processing system 10, according to some example embodiments of the present disclosure.

At 402, the compressor 110 (or processor) identifies an mTile (e.g., a set of cTiles) associated with an image data to be compressed in the image pipeline. Each child cTile of the mTile includes a plurality of pixels of the image data. The size of the cTile may be the same as that of a cache line of the graphics processing system 10. The compressor 110 then selects the first cTile (e.g., first non-pivot cTile) of the mTile for further analysis and compression.

At 404, the compressor 110 identifies a pivot pixel in the cTile. In some examples, the pivot pixel may be a static pixel within the cTile. The compressor 110 then compares pixels within the cTile with the pivot pixel by calculating deltas (e.g., differences) between binary values of the pixels of the cTile and the pivot pixel. The deltas may be calculated using an XOR operation. For example, the compressor 110 may calculate the deltas (e.g., channel deltas or channel difference) at a channel level and also compare the deltas of corresponding channels of the pivot pixel and other cTile pixels.

At 406, the compressor 110 determines whether all of the pixels within the cTile are the same by, for example, determining whether all of the deltas are zero.

If all of the deltas are the same (i.e., all of the cTile pixels have the same binary value), at 408, the compressor 110 labels the cTile as a constant (or flat) cTile. The compressor 110 then saves the binary value of the cTile (e.g., the binary values of each of the pixel channels of the cTile) and proceeds to analyze the next pixel within the cTile at 402.

If all of the deltas are not the same (i.e., all of the cTile pixels do not have the same binary value), at 410, the compressor 110 calculates a size of the cTile when compressed using a variable-length code, such as a Golomb-Rice code, Huffman code, and/or the like.

If the combined number of bits representing the pixels (e.g., the different pixel channels) of the cTile does not fit within any of the allowable quantized compression sizes (e.g., 8, 16, 24, 32, 40, or 48 bytes, when the cache line is 64 bytes), at 412, the cTile is labeled as an uncompressed cTile and no compression is performed on the cTile (i.e., the cTile is passed through the compressor 110).

If, on the other hand, the combined number of bits representing the pixels of the cTile does fit within one of the allowable quantized compression sizes, then the compressor 110 labels the cTile as a differential type, at 414, and proceeds to encode the cTile using the variable-length code (e.g., the Golomb-Rice code or the Huffman code).

At 416, the compressor checks whether every last cTile in the mTile has been analyzed. If not, the process begins again at 402.

Once every cTile in the mTile has been analyzed, at 418, the compressor proceeds to generate a metadata entry indicating the compression type of each one of the cTiles within the mTile and defining a mapping between an uncompressed address space of the cTiles (as, e.g., used by elements of the graphics processing system that are external to the compression system 100) and a compressed address space (used by the compression system 100).

If all of the cTiles within the mTile have the same constant binary value (e.g., all corresponding channels have same values), the compressor 110 labels the whole mTile as constant and generates a single metadata entry that includes the constant label and the constant binary value of the cTiles (e.g., includes the binary values of each of the pixel channels for one of the cTiles). As such, the compressor 110 does not have to write any value to the memory cache 14 and decompression of the mTile may later be performed based only on the metadata entry.

Otherwise, the compressor 110 writes each of the compressed cTiles and/or uncompressed cTiles into a next available memory location within the memory cache 14. The compressor 110 then generates a single metadata entry that indicates the compression type of every cTile, the length of each cTile, as well as the base address and the offset of each of the cTiles.

Figure 5:
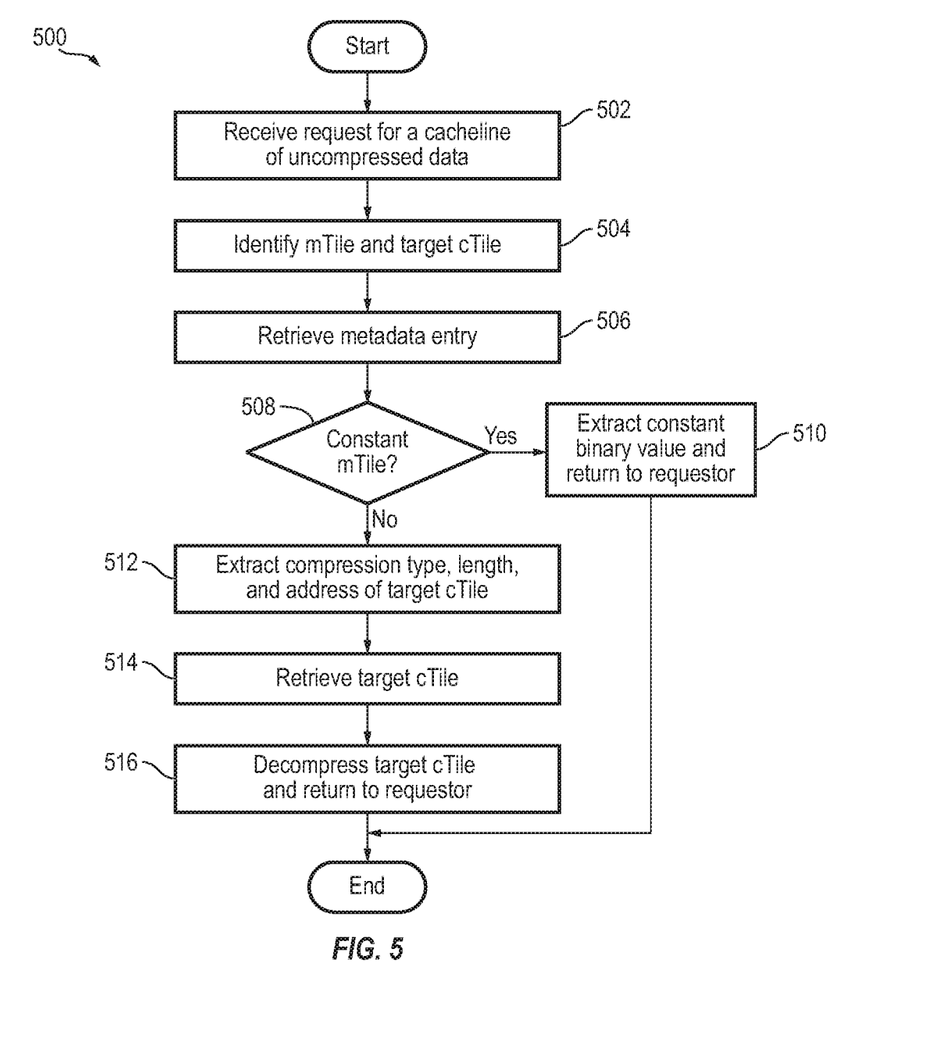
FIG. 5 is a flow diagram illustrating a process of variable rate decompression of image data in an image pipeline of the graphics processing system, according to some example embodiments of the present disclosure.

FIG. 5 is a flow diagram illustrating a process 500 of variable rate decompression of image data in an image pipeline of the graphics processing system 10, according to some example embodiments of the present disclosure.

At 502, the decompressor 120 (or processor) receives a request for a cache line of uncompressed pixel data from a requestor (e.g., the texture unit 16).

At 504, the decompressor 120 identifies, based on the request, an mTile and its child cTiles (a set of cTiles) that include the desired cTile ("target cTile"), which corresponds to the requested cache line of uncompressed pixel data. The decompressor 120 may do so by looking into a header table of the metadata cache 130.

At 506, the decompressor 120 may retrieve a metadata entry associated with the mTile from the metadata cache 130. The metadata cache 130 may capture reuse of metadata, that is, keep the last few metadata cache lines within in to reduce fetched from the memory cache 14. If a meta data entry is not found in the metadata cache 130, the decompressor 120 may request and retrieve if from the memory cache 14.

At 508, the decompressor 120 may determine, based on the meta data entry, whether the mTile is a constant mTile. If the mTile is of a constant type, at 510, the decompressor 120 may extract a constant binary value of the mTile from the metadata entry and return the binary value to the requestor (e.g., the texture unit 16) as the cache line of uncompressed pixel data.

If the mTile is not constant, at 512, the decompressor 120 extracts the compression type of the target cTile, an address of the target cTile within the memory cache from the metadata entry, and a length of the target cTile. The decompressor 120 may look up the base address of the mTile and the offset of the target cTile to compute the actual memory address of the compressed cTile in the memory cache 14. The decompressor 120 may also extract the length of target cTile to determine how many bits (or bytes) to read from the computed address in the memory cache 14.

At 514, the decompressor 120 may retrieve the target cTile from the memory cache 14 based on the address of the target cTile and the length of the cTile.

At 516, the decompressor 120 may decompress the retrieved target cTile based on the compression type of the target cTile and return the decompressed target cTile to the requestor as the requested cache line of uncompressed pixel data.

Because the compression method, according to embodiments of the present disclosure, operates at a bit level and is agnostic underlying format of the data and the basic unit of compression is a memory subsystem cache line, the compression method described herein may be used in tandem with any existing texture compression method already present in hardware. As such, embodiments of the present disclosure allow for stacking of compression methods.

As described above, the compression system, according to embodiments of the present disclosure, provides a simple yet flexible implementation that may readily be adopted in any suitable system (such as a GPU, CPU, a graphics processing system having a camera, etc.).

It will be understood that, although the terms "first", "second", "third", etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the inventive concept". Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on", "directly connected to", "directly coupled to", or "immediately adjacent" another element or layer, there are no intervening elements or layers present.

As used herein, the terms "use", "using", and "used" may be considered synonymous with the terms "utilize", "utilizing", and "utilized", respectively.

The compression system and/or any other relevant devices or components according to embodiments of the present disclosure described herein may be implemented by utilizing any suitable hardware, firmware (e.g., an application-specific integrated circuit), software, or a suitable combination of software, firmware, and hardware. For example, the various components of the independent multi-source display device may be formed on one integrated circuit (IC) chip or on separate IC chips. Further, the various components of the compression system may be implemented on a flexible printed circuit film, a tape carrier package (TCP), a printed circuit board (PCB), or formed on the same substrate. Further, the various components of the compression system may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present disclosure.

While this disclosure has been described in detail with particular references to illustrative embodiments thereof, the embodiments described herein are not intended to be exhaustive or to limit the scope of the disclosure to the exact forms disclosed. Persons skilled in the art and technology to which this disclosure pertains will appreciate that alterations and changes in the described structures and methods of assembly and operation can be practiced without meaningfully departing from the principles, and scope of this disclosure, as set forth in the following claims and equivalents thereof.

What is claimed is:

1. A method of variable rate compression of image data in an image pipeline of a graphics processing system, the method comprising:
    identifying, by a processor of the graphics processing system, a set of cTiles associated with the image data, each cTile comprising a plurality of pixels;
    for each cTile of the set of cTiles:
        identifying, by the processor, a pivot pixel from among the plurality of pixels;
        identifying, by the processor, a compression type of the cTile by comparing binary values of pixels within the cTile with a binary value of the pivot pixel; and
        compressing, by the processor, the cTile based on the identified compression type; and
    generating, by the processor, a metadata entry associated with the set of cTiles, the metadata entry indicating the compression type of each one of the set of cTiles and defining a mapping between an uncompressed address space of the set of cTiles and a compressed address space.

2. The method of claim 1, wherein the image data is a texture or an image, and wherein the variable rate compression is a lossless compression.

3. The method of claim 1, wherein the plurality of pixels comprises spatially contiguous pixels, and
    wherein each cTile corresponds in size to a cache line of the graphics processing system.

4. The method of claim 1, wherein the pivot pixel is a static pixel within each one of the set of cTiles.

5. The method of claim 1, wherein the identifying the compression type of the cTile comprises:
    calculating, by the processor, differences between binary values of the pixels of the cTile and the pivot pixel; and
    determining, by the processor, whether all the differences are zero.

6. The method of claim 5, wherein each pixel of the plurality of pixels in the cTile comprises one or more channels,
wherein the calculating the differences comprises:
for each of the one or more channels, calculating, by the processor, channel differences between corresponding channel binary values of the pixels of the cTile and the pivot pixel, and
wherein the determining whether all the differences are zero comprises:
determining, by the processor, that the channel differences are zero for each of the one or more channels.

7. The method of claim 5, wherein the identifying the compression type of the cTile further comprises:
in response to determining that all differences are zero, determining, by the processor, the compression type as a constant type.

8. The method of claim 5, wherein the identifying the compression type of the cTile further comprises:
in response to determining that all differences are not zero, calculating, by the processor, a size of the cTile when compressed;
determining, by the processor, whether the size of the cTile when compressed fits within one of quantized compression sizes;
in response to determining that the size of the cTile when compressed fits within one of the quantized compression sizes, identifying, by the processor, the compression type as a differential type; and
in response to determining that the size of the cTile when compressed does not fit within one of the quantized compression sizes, identifying, by the processor, the compression type as an uncompressed type.

9. The method of claim 8, wherein a cache line size is 64 bytes and the quantized compression sizes comprise 8, 16, 24, 32, 40, or 48 bytes.

10. The method of claim 8, wherein compressing the cTile based on the identified compression type comprises:
encoding, by the processor, the cTile using a variable-length code, in response to determining that the compression type is the differential type; and
passing through the cTile without encoding, in response to determining, by the processor, that the compression type is uncompressible.

11. The method of claim 10, wherein the variable-length code is a Golomb-Rice code or a Huffman code.

12. The method of claim 1, wherein generating a metadata entry associated with the set of cTiles comprises:
determining, by the processor, whether all of the set of cTiles have the same constant binary value; and
in response to determining that all of the set of cTiles have a same constant binary value, generating, by the processor, the metadata entry to comprise the constant binary value and indicating that the compression type is a constant type.

13. The method of claim 1, wherein generating a metadata entry associated with the set of cTiles comprises:
write the compressed cTile into a next available memory location within a memory cache coupled to the processor; and
generating the metadata entry to comprise the compression type, length and address of each one of the set of cTiles,
wherein the address comprises a base address of the set of cTiles and an offset of a corresponding one of set of cTiles from the base.

14. A method of variable rate decompression of image data in an image pipeline of a graphics processing system, the method comprising:
receiving, by a processor of the graphics processing system, a request for a cache line of uncompressed pixel data from a requestor;
identifying, by the processor, a set of cTiles comprising a target cTile based on the request, the target cTile corresponding to the cache line of uncompressed pixel data;
retrieving, by the processor, a metadata entry associated with the set of cTiles;
determining, by the processor, whether the set of cTiles are constant based on the retrieved metadata entry;
in response to determining that the set of cTiles are constant, extracting, by the processor, a constant binary value of the set of cTiles from the metadata entry and returning the constant binary value to the requestor as the cache line of uncompressed pixel data; and
in response to determining that the set of cTiles are not constant:
extracting, by the processor, a compression type of the target cTile, an address of the target cTile from the metadata entry, and a length of the target cTile;
retrieving, by the processor, the target cTile from a memory cache based on the address of the target cTile and the length of the cTile; and
decompressing, by the processor, the retrieved target cTile based on the compression type of the target cTile, and returning the decompressed target cTile to the requestor as the cache line of uncompressed pixel data.

15. The method of claim 14, wherein the address comprises a base address of the set of cTiles and an offset of the target cTile from the base.

16. The method of claim 14, wherein the identifying the set of cTiles comprises:
mapping, by the processor, the request to the set of cTiles in the memory cache.

17. The method of claim 14, wherein a size of each of the set of cTiles is less than a cache line size, and a size of the decompressed target cTile is equal to the cache line size.

18. The method of claim 14, wherein the compression type comprises a constant type, an uncompressed type, or a differential type.

19. The method of claim 14, wherein a length of the cache line is 64 bytes, and
wherein a length of the target cTile is 8, 16, 24, 32, 40, or 48 bytes.

20. A graphics processing system for variable rate compression of image data in an image pipeline, the system comprising:
a processor; and
a processor memory local to the processor, wherein the processor memory has stored thereon instructions that, when executed by the processor, cause the processor to perform:
identifying a set of cTiles associated with the image data, each cTile comprising a plurality of pixels;
for each cTile of the set of cTiles:
identifying a pivot pixel from among the plurality of pixels;
identifying a compression type of the cTile by comparing, at a bit level, pixels within the cTile with the pivot pixel; and
compressing the cTile based on the identified compression type; and generating a metadata entry associated with the set of cTiles, the metadata entry indicating the compression type of each one of the set of cTiles and defining a mapping between an uncompressed address space of the set of cTiles and a compressed address space.

* * * * *